United States Patent Office 3,442,634
Patented May 6, 1969

3,442,634
METHOD OF MANUFACTURE OF GLASS-SEALED
SEMICONDUCTOR DEVICE
Kaichiro Katori and Shinichi Kamiyama, Tokyo, Japan,
assignors to Fujitsu Limited, Kawasaki, Japan, a corporation of Japan
Filed Oct. 16, 1964, Ser. No. 404,455
Claims priority, application Japan, Oct. 17, 1963,
38/55,552
Int. Cl. C03b 23/20
U.S. Cl. 65—42                              3 Claims

ABSTRACT OF THE DISCLOSURE

The open end portion of a glass housing for a semiconductor device is heated to soften such open end while the electrode assembly of the device is maintained spaced a small distance from the surface of the semiconductor body of the device. The open end portion of the glass housing is then heated additionally to seal such open end around a glass bead through which a lead wire of the electrode assembly passes and the electrode assembly is moved into electrical contact with the surface of the semiconductor body during the completion of such sealing.

---

Our invention relates to a method of manufacture of a glass-sealed semiconductor device. More particularly, the invention relates to a method of manufacture of a glass-sealed semiconductor device which enables the completion of the sealing of the semiconductor parts into the glass housing and the sealing of the glass housing without residual stress.

Heretofore, after the completion of the electrical connection to the semiconductor body, the glass housing was sealed by heating. Thus, after sealing, residual stress between the semiconductor device and the glass housing caused displacement of arranged electrodes and opening of the electrical connection. The residual stress was caused by the softness of the glass upon sealing. This resulted in non-uniformity of sealed units, faulty units and units which in most cases were incapable of suitable anticipated operation and were unreliable.

The principal object of the present invention is to provide a new and improved method of manufacture of a glass-sealed semiconductor device.

In accordance with the method of our invention, the glass housing is softened by heat while the electrode of the semiconductor device is maintained spaced a small distance from the semiconductor body and the electrode is made to contact the semiconductor body with suitable pressure as the sealing of the glass housing is completed. This eliminates any residual stress and provides suitably sealed units which are uniform and which operate suitably and as anticipated, and which are reliable in operation.

In order that the invention may be readily carried into effect, it will now be described with reference to the accompanying drawing, wherein.

Figure 1:
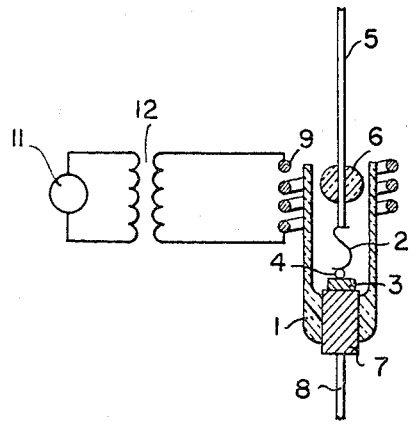
FIG. 1 is a sectional view of an embodiment of a semiconductor device and a glass housing in which it is to be sealed, prior to sealing.

In FIG. 1, a two-terminal semiconductor diode device is housed in an open glass housing 1 which is to be sealed. A contact ribbon 2 makes electrical contact with a semiconductor body 3 via a contact ball 4. A lead wire 5 passes through a glass bead 6 and makes electrical contact with the ribbon 2. The lead wire 5, the ribbon 2 and the contact ball 4 comprise the electrode system of one side of the semiconductor body 3. An electrode 7 makes electrical contact with the other side of the semiconductor body 3 and a lead wire 8 makes electrical contact with the electrode 7.

The contact ball 4 may comprise gold, tin, nickel or other suitable material and is utilized primarily when the surface of the semiconductor body 3 is of planar configuration. The contact ball 4 makes electrical contact with the surface of the semiconductor body 3 and with a convex surface of the ribbon 2. A heater 9 is provided and may comprise any suitable heating apparatus such as, for example, an electrically energized induction heating coil, which may, for example, be energized by electrical energy from an AC source 11 of electrical energy via a transformer 12. The heater 9 is positioned to heat the upper portion of the glass housing 1 so that it will fuse with the bead 6 and thereby seal the semiconductor device in said glass housing.

Figure 2:
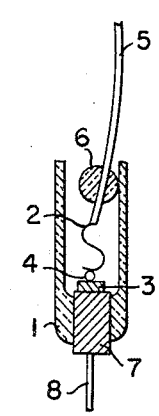
FIG. 2 is a sectional view of the embodiment of FIG. 1 with a displaced electrode, prior to sealing.

The lead wires 5 and 8 may be displaced in relation to each other and may be non-linearly disposed in relation to each other, as indicated in FIG. 2. This may be due to the need to bend the lead wire 5, for example, in order to maintain precision and accuracy in the arrangement of the component of the semiconductor device and in the contacts between such components.

Figure 3:
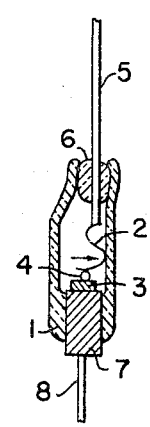
FIG. 3 is a sectional view of the unit of FIG. 2 with a distorted electrode system after the housing is sealed.

If the glass housing 1 is heated by the heater 9 in order to realign the lead wire 5 with the lead wire 8 and to seal the housing, the glass of the upper portion of said glass housing is softened and the ribbon 2 is shifted in the direction of the arrow in FIG. 3. This leaves the components out of alignment, as shown in FIG. 3, with a distorted electrode system.

In the unit of FIG. 3, the surface of the semiconductor body 3 is damaged due to the excessive contact pressure applied to it during the shifting of the ribbon 2. This causes deterioration of the characteristics of the semiconductor device, breaking of the electrical contacts and unreliability in operation of the unit. These serious and incapacitating shortcomings of the faulty units may not be readily detected and would thus cause considerable difficulties to the ultimate users of such units.

To avoid these difficulties, the manufacture of the units must be carefully controlled to a great extent in order to maintain the precision and accuracy of positioning of the components as well as the alignment of the lead wires 5 and 8. The method of manufacture must, however, include the heat sealing, and it is the heat sealing which causes the imprecision and inaccuracy of positioning of the components and the misalignment of the lead wires and which causes the unreliability in operation of the unit.

The method of manufacture of the present invention eliminates the difficulties of the prior art methods including deterioration of the characteristics of the semiconductor device, the breaking of electrical contacts and the unreliability in operation of the unit.

Figure 4:
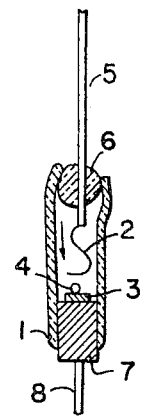
FIG. 4 is a sectional view of the unit of FIG. 1 during the method of manufacture of the present invention.

In accordance with our invention, the ribbon 2 is maintained spaced a small distance from the semiconductor body 3, as shown in FIG. 4, while the heater 9 is energized to soften the upper portion of the glass housing 1. When the glass is softened, the lead wire 5 is realigned if necessary, such as, for example, from its position shown in FIG. 2, as shown in FIG. 4. Then, as the sealing of the glass housing 1 is completed, the lead wire 5 is moved or pushed toward the semiconductor body 3, as indicated by the arrow in FIG. 4, to cause electrical contact between said lead wire and said semiconductor body via the ribbon 2 and the contact ball 4 at a suitable pressure between these components.

In a unit manufactured by the method of manufacture of the present invention, the lead wires 5 and 8 are not displaced in any transverse direction. The presence of a residual stress in the ribbon 2 is quite unlikely and any residual stress which may possibly be evident is in a direction along the axis of the lead wires, so that there is no change in position of the components of the completed sealed unit. The completed unit is very well stabilized.

Figure 5:
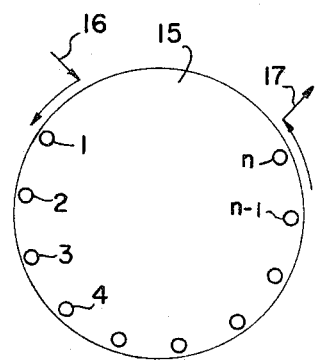
FIG. 5 is a schematic presentation of an automatic production system.

FIG. 5 is a schematic presentation of an automatic production system. The system presented schematically by FIG. 5 is a turntable which permits each unit to be moved to different positions where different steps of the method of manufacture of the invention are performed. Thus at position 1, for example, the lead wires 5 and 8 (FIGS. 1 to 4) may be aligned. At position 2, for example, the upper portion of the glass housing may be softened. At position 3, for example, the ribbon 2 (FIGS. 1 to 4) may be spaced a small distance from the semiconductor body 3. At position 4, for example, the upper portion of the glass housing may continue to be softened. The various steps may be undertaken in this manner at various positions, which need not necessarily number ten as shown in FIG. 5, relative to the turntable.

In FIG. 5, the turntable 15 may revolve about its axis in a counterclockwise direction, as indicated. Each unsealed unit may be positioned on the turntable at the point indicated by arrow 16, be manufactured in accordance with the method of the present invention by steps undertaken at the necessary number of positions $n$, and be removed as a completed sealed unit at the point indicated by arrow 17.

The method of manufacture of the present invention may be utilized with devices and apparatus other than semiconductor devices and apparatus and may be utilized with multiterminal devices rather than two terminal devices.

While the invention has been described by means of specific examples and in a specific embodiment, we do not wish to be limited thereto, for obvious modifications will occur to those skilled in the art without departing from the spirit and scope of the invention.

We claim:

1. A method of manufacture of a glass sealed semiconductor device having a semiconductor body and an electrode assembly including a lead wire passing through a glass bead and adapted to electrically contact a surface of said semiconductor body, said method of manufacture comprising the steps of positioning the semiconductor device in an open ended glass housing with the lead wire of the electrode assembly of said semiconductor device extending from the open end of said glass housing and the glass bead at said open end of said glass housing, the glass bead being smaller than the open end of the glass housing;

adjusting the semiconductor device to obtain proper alignment of the contacts;

heating the open end portion of said glass housing to soften said open end;

maintaining the electrode assembly of said semiconductor device spaced a small distance from the surface of the semiconductor body of said semiconductor device during heating of the open end portion of said glass housing;

heating the open end portion of said glass housing to seal the open end around said glass bead; and moving the electrode assembly of said semiconductor device into electrical contact with the surface of the semiconductor body of said semiconductor device during the completion of the sealing of said open end.

2. A method of manufacture of a glass sealed semiconductor device having a semiconductor body, a contact ribbon adapted to electrically contact a surface of said semiconductor body and a lead wire passing through a glass bead and adapted to be electrically connected to said contact ribbon, said method of manufacture comprising the steps of positioning the semiconductor device in an open ended glass housing with the lead wire of said semiconductor device extending from the open end of said glass housing and the glass bead at said open end of said glass housing, the glass bead being smaller than the open end of the glass housing;

adjusting the semiconductor device to obtain proper alignment of the contacts;

heating the open end portion of said glass housing to soften said open end;

maintaining the contact ribbon of said semiconductor device spaced a small distance from the surface of the semiconductor body of said semiconductor device during heating of the open end portion of said glass housing;

heating the open end portion of said glass housing to seal the open end around said glass bead; and moving the contact ribbon of said semiconductor device into electrical contact with the surface of the semiconductor body of said semiconductor device during the completion of the sealing of said open end.

3. A method of manufacture of a glass sealed semiconductor device having a semiconductor body, a ball contact in electrical contact with a surface of said semiconductor body, a contact ribbon adapted to electrically contact said contact ball and a lead wire passing through a glass bead and adapted to be electrically connected to said contact ribbon, said method of manufacture comprising the steps of positioning the semiconductor device in an open ended glass housing with the lead wire of said semiconductor device extending from the open end of said glass housing and the glass bead at said open end of said glass housing, the glass bead being smaller than the open end of the glass housing;

adjusting the semiconductor device to obtain proper alignment of the contacts;

heating the open end portion of said glass housing to soften said open end;

maintaining the contact ribbon of said semiconductor device spaced a small distance from the contact ball of the semiconductor body of said semiconductor device during heating of the open end portion of said glass housing;

heating the open end portion of said glass housing to seal the open end around said glass bead; and moving the contact ribbon of said semiconductor device into electrical contact with the contact ball of the semiconductor body of said semiconductor device during the completion of the sealing of said open end.

References Cited

UNITED STATES PATENTS

| 2,745,045 | 5/1956 | Ingraham | 65—42 |
| 2,832,016 | 4/1958 | Bakalar | 65—42 |
| 3,155,478 | 11/1964 | O'Brien | 65—42 |
| 3,172,188 | 3/1965 | Wood | 65—59 |

FOREIGN PATENTS 1,097,040   1/1961   Germany.

DONALL H. SYLVESTER, *Primary Examiner.*

ROBERT L. LINDSAY, JR., *Assistant Examiner.*

U.S. Cl. X.R.

29—25.13; 65—54, 55, 59, 64